United States Patent [19]

Hadley

[11] Patent Number: 4,949,652
[45] Date of Patent: Aug. 21, 1990

[54] WASTE DISPOSAL SYSTEM

[76] Inventor: Henry H. Hadley, Old Country Rd., Lincoln, Mass. 01773

[21] Appl. No.: 371,340

[22] Filed: Jun. 26, 1989

[51] Int. Cl.⁵ .............................................. F23J 15/00
[52] U.S. Cl. ................................... 110/215; 110/210; 110/235; 55/228; 55/97
[58] Field of Search ........................ 110/215, 235, 210; 55/341, 233, 228, 90, 97, 258

[56] References Cited

U.S. PATENT DOCUMENTS

| | | | |
|---|---|---|---|
| 3,395,512 | 8/1968 | Finney, Jr. et al. | 55/97 |
| 3,668,833 | 6/1972 | Cahill, Jr. | 110/210 |
| 3,670,669 | 6/1972 | Hoad | 110/215 |
| 3,884,162 | 5/1975 | Schuster | 110/210 |
| 4,256,045 | 3/1981 | Johnson, Jr. | 110/215 |
| 4,320,709 | 3/1982 | Hladun | 110/210 |
| 4,644,877 | 2/1987 | Barton et al. | 110/215 |
| 4,676,177 | 6/1987 | Engstrom | 110/210 |
| 4,715,965 | 12/1987 | Sigerson et al. | 55/97 |
| 4,726,302 | 2/1988 | Hein et al. | 110/215 |

Primary Examiner—Henry A. Bennet
Assistant Examiner—Denise L. Ferensic

[57] ABSTRACT

This invention is directed at an infectious waste incinerator system using primary and secondary combustion chambers to reduce the waste to gaseous and particulate matter. Which is passed through a waste heat recovery boiler reduces the temperature of the gaseous and particulate matter and send the recovered heat to pipes. The cooled gaseous and particulate matter is passed to a baghouse packed-bed scrubber where the gaseous and particulate matter is further cooled and diluted. The gaseous and particulate matter is then passed to the lower end of a packed-bed scrubber when it is passed to a treatment tank where it is subjected, in a neutralizing compartment, to a hydroxide and is also surface skimmed. The skimmed material is passed through a filter system and then returned to the treatment tank. The gaseous treated material is pumped back into the packed-bed scrubber and then out an exhaust stack.

5 Claims, 3 Drawing Sheets

WASTE DISPOSAL SYSTEM

BACKGROUND OF THE INVENTION

Field of the Invention

This invention relates to a waste disposal system and more specifically to a waste disposal system for disposing of contaminated medical waste material.

SUMMARY OF THE INVENTION

A waste disposal system for controlled burning and safe disposal of contaminated materials comprising a means of holding the contaminated materials having a feed means associated therewith, the feed means transporting the contaminated materials to a primary incinerator chamber, the primary incinerator chamber providing a primary combustion of the contaminated materials, the primary incinerator chamber in communication with a secondary incinerator chamber, the incinerated material of the primary incinerator chamber passed to the secondary incinerator chamber, the secondary incinerator chamber providing a secondary combustion of the incinerated material, the secondary incinerator chamber in communication with in communication with a bag filter which is connected to a packed column scrubber, the packed column scrubber in communication with a secondary scrubber having a sump tank connected thereto, an exhaust stack in communication with the packed column scrubber for exhausting the smoke from the packed column scrubber to an external environment, the smoke substantially free of hazardous contaminants.

BRIEF DESCRIPTION OF THE DRAWINGS

Further details are explained below with the help of the example(s) illustrated in the attached drawings in which.

DESCRIPTION OF THE PREFERRED EMBODIMENT(S)

Figure 1:
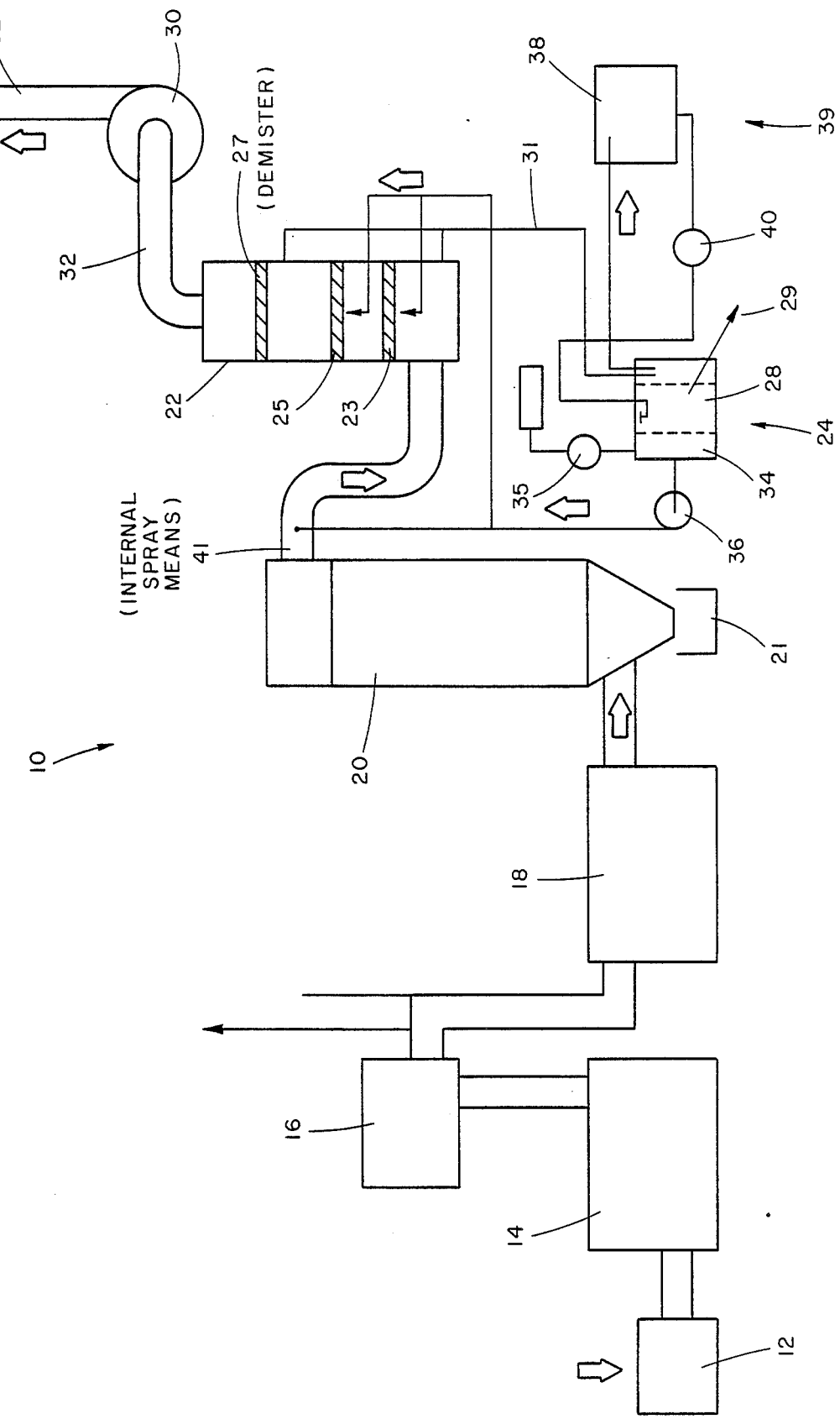
FIG. 1 is a schematic view of a waste disposal system for controlled burning, useful heat output and safe disposal of solid contaminated medical waste materials according to the present invention.
Figure 2:
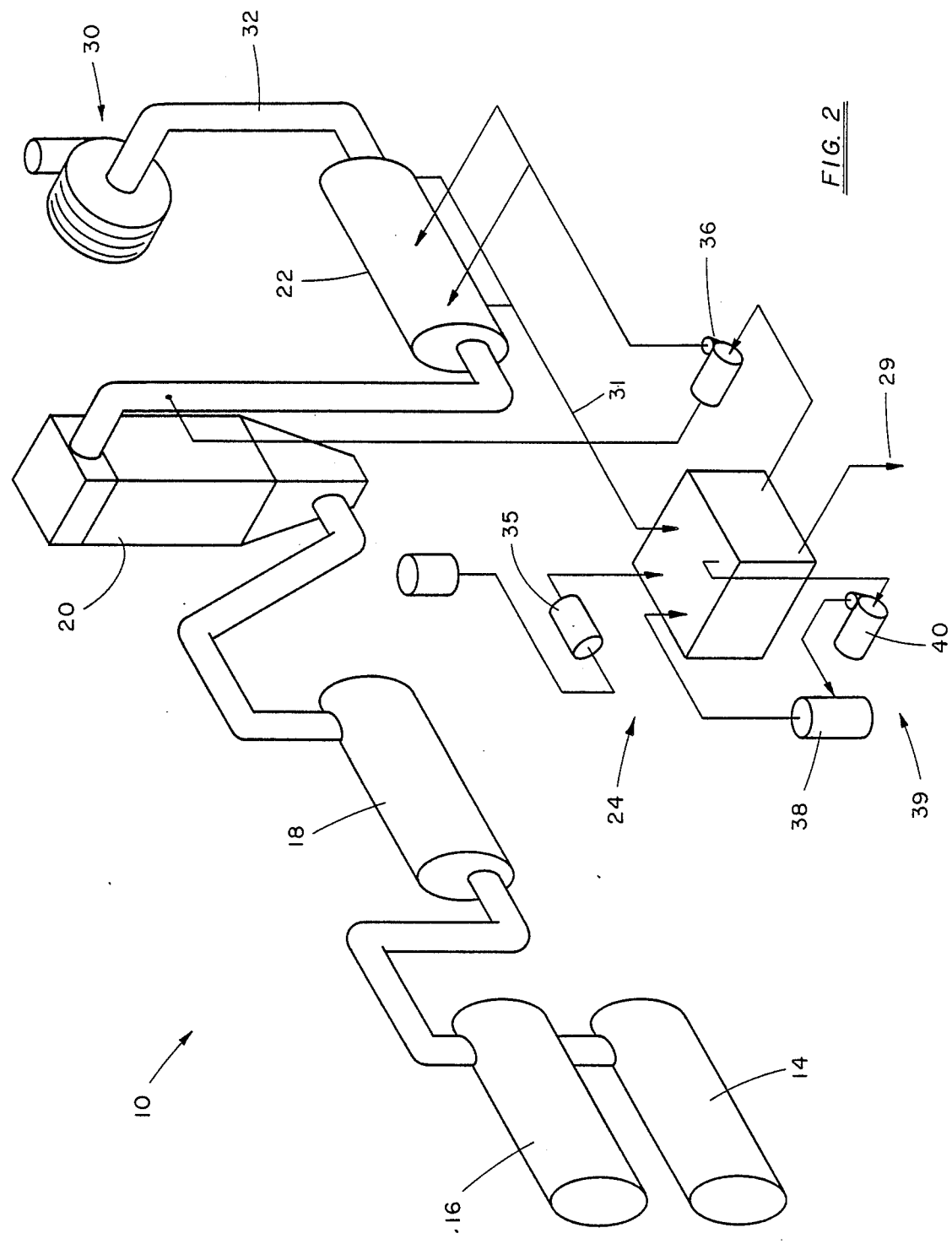
FIG. 2 is an isometric schematic drawing of the waste disposal system for controlled burning, useful heat output and safe disposal of solid contaminated medical waste materials shown in FIG. 1.
Figure 3:
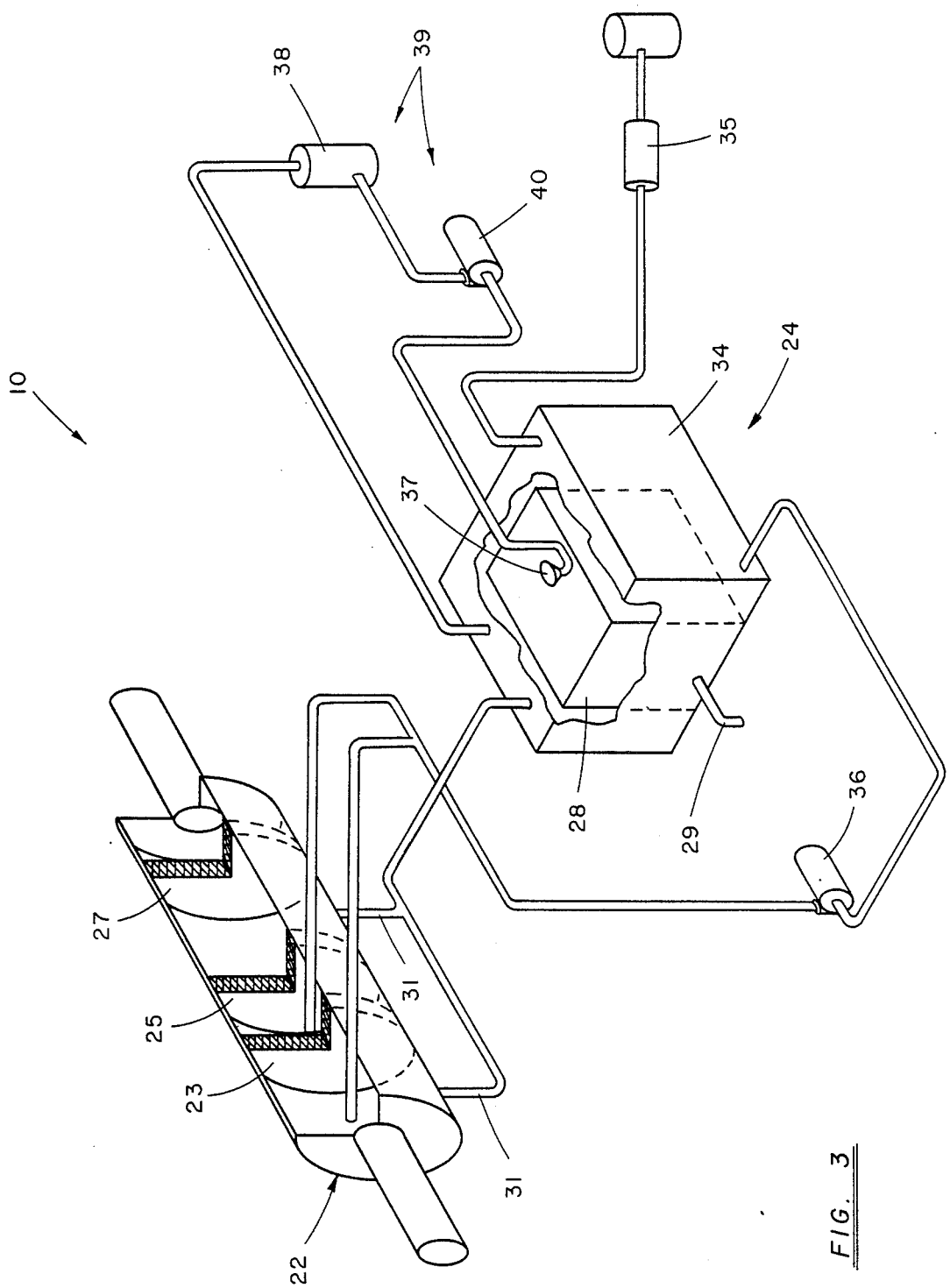
FIG. 3 is an isometric schematic drawing (partly broken away) of the lower downstream portion of the waste disposal system for controlled burning, useful heat output and safe disposal of solid contaminated medical waste materials shown in FIG. 2.

There is shown in the drawings a waste disposal system 10 for controlled burning, useful heat output and safe disposal of solid contaminated medical waste materials. The waste disposal system 10 comprises a ram feeder 12 as part of a Simonds Model AF-4B infectious waste incinerator which includes a primary incinerator chamber 14, an afterburner or secondary incinerator chamber 16, a waste heat recovery boiler 18, and an ash disposal system (not shown). The pneumatically operated ram feeder 12 feeds an average of 140 pounds of contaminated materials into the primary incinerator chamber 14 every ten minutes, giving a cumulative, maximum feed rate of 850 pounds of contaminated materials per hour. The primary incinerator chamber 14 provides a primary combustion of the contaminated materials utilizing temperatures of around 1350 degrees F. This temperature burns the contaminated materials creating as oxidation products HCl, $H_2O$ in the form of steam, $CO_2$, metallic oxides and a residue of organic gases. The primary incinerator chamber 14 is in communication with a secondary incinerator chamber 16. The incinerated material gases and particulate matter from the primary incinerator chamber 14 is passed to the secondary incinerator chamber 16. The secondary incinerator chamber 16 using temperatures in the range of 1600–2000 degree F. provides a secondary combustion of the incinerated material from the primary incinerator chamber 14. This temperature burns the contaminated materials creating as oxidation products HCl, $H_2O$ in the form of steam, $CO_2$, metallic oxides and a residue of organic gases. The secondary incinerator chamber is in communication with the waste heat recovery boiler, a York Shipley Model No. HRH 750 heat recovery boiler, downstream thereof, as shown in FIG. 2, which reduces the heat from the primary and secondary combustions (exhaust gases) from a temperature of 1800 degrees F. to 400 degrees F. when they exit. The recovered heat from the waste heat recovery boiler 18 is used to create steam which can be used in hospital steam pipes for example. A bypass line upstream of the heat recovery boiler will be used during boiler shutdown or emergency periods to duct exhaust gases to a bypass stack. The bypass line is to be utilized during emergencies only. The gaseous secondary combustion material is passed through a model SS64PJ Wickberg stainless steel bag house 20. The bag house 20 has an air handling capacity of 5000 scfm at 4 inches of of water column. The gaseous secondary combustion material entering the bag house 20 is diluted and cooled by an adjustable inlet air damper (not shown) to maintain the bag house 20 air inlet temperature at 400 degrees F. The temperature within the bag house 20 is maintained above the dew point of Hydrogen Chloride. The bag house 20 includes 64 filter tubes (not shown) formed of an isaramid such as Nomex, a trademark of the Dupont Company. Each of the filter tubes has an effective surface area of 12.5 square feet to give a surface area of 800 square feet. The filter tubes are jet pulse cleaned in groups of eight every sixty seconds. Soot from the jet pulse cleanings will be collected in an inverted pyramidal hopper 21 having a volume of 24 cubic feet. The gaseous secondary combustion material is discharged from the bag filter 20 through a duct into an Ambi, Inc. custom-made, horizontal, packed-bed scrubber 22 rated at 3400 actual cubic feet per minute capacity at 175 degrees F. The duct from the bag filter 20 to the scrubber 22 includes an internal spray means 41 whose operation will be setforth hereinafter. The scrubber 22 has a length of 10.6 feet and a cross sectional area of 14.5 feet and includes two Kimre packed-beds namely, a first packed bed 23 and a second packed bed 25, a demister 27 and four spray heads covering each of the packed beds. The packed column scrubber 22 is communicatively connected at its lower end and at it central portion by drain pipes 31 with a treatment tank 24. The scrubber 22 at its exit end communicates with an exhaust stack 32. The treatment tank 24 includes a neutralizing compartment 34, which has a sump tank 28 connected thereto into which the two drain pipes 31 exhaust. A first pump 35 (see FIG. 3) pumps an aqueous solution of 10 percent by weight of sodium hydroxide into the neutralizing compartment 34. A main pump 36 is connected between the neutralizing compartment 34 and the base and the central portion of the packed column scrubber 22 as shown in FIG. 3. The neutralizing compartment 34, as shown in FIG. 3 has a skimmer 37 operating on the surface which communicates with a filter system 39. The filter system 39 comprises a condensable organic filter 38 and a second pump 40. The condensable organic filter may be a carbon filter. The second pump 40 moves the material skimmed from the neutralizing compartment 34 through the filter 38 removing organic material as particulate matter floating on the surface of the neutralizing compartment 34. An NaCl bleed 29 is position on the base of the sump tank 28 to keep the concentration of NACL from becoming too great. The gaseous secondary combustion material as it is cleaned by the packed column scrubber 22 forms a liquid material and at the lower end of the packed column scrubber 22, the liquid material is caused to discharge, by the action of the main pump 36, into the treatment tank 24. The secondarily scrubbed and filtered gaseous tertiary combustion material (ie. The remaining combustion material after it has gone through the primary incinerator chamber 14, the secondary incinerator chamber 16, the waste heat recovery boiler 18, the bag house 20 and the first packed bed 23) is passed into the middle portion of the packed column scrubber 22 and is then drawn into the exhaust stack 32 by action of the blower 30 located within the exhaust stack 32. The thoroughly cleansed gaseous tertiary combustion material is then exhausted to an external environment substantially free of hazardous contaminants.

What I claim is:

1. A waste disposal system for controlled burning and safe disposal of contaminated materials comprising a means of holding the contaminated materials having a feed means associated therewith, the feed means transporting the contaminated materials to an incinerator chamber, the incinerator chamber providing a combustion of the contaminated materials, the incinerator chamber in communication with a bag filter which is connected to a packed column scrubber, the packed column scrubber including a first packed bed and a second packed bed and means of maintaining the bag filter at a temperature above the dew point of HCl the first packed bed in communication with the second packed bed, the packed column scrubber having a sump tank connected thereto, an exhaust stack in communication with the packed column scrubber for exhausting the smoke from the packed column scrubber to an external environment, the smoke substantially free of hazardous contaminants.

2. The waste disposal system as set forth in claim 1 wherein the incinerator chamber further comprising primary and secondary incinerator chambers, the feed means transporting the contaminated materials to the primary incinerator chamber, the primary incinerator chamber providing a primary combustion of the contaminated materials, the primary incinerator chamber in communication with the secondary incinerator chamber, the incinerated material of the primary incinerator chamber passed to the secondary incinerator chamber, the secondary incinerator chamber providing a secondary combustion of the incinerated material, the secondary incinerator chamber in communication with the bag filter.

3. The waste disposal system as set forth in claim 2 further comprising a heat exchange means, the heat exchange means downstream from the primary and secondary incinerator chambers for utilizing the heat therefrom, the heat exchange means in communication with the bag filter.

4. The waste disposal system as set forth in claim 1 further comprising a carbon filter, the carbon filter having an inlet and an outlet, the inlet and outlet connected to the sump tank.

5. The waste disposal system as set forth in claim 1 further comprising a condensable organic filter, the condensable organic filter connected only to the sump tank.

* * * * *